United States Patent
Hamoir et al.

(10) Patent No.: US 7,197,247 B2
(45) Date of Patent: Mar. 27, 2007

(54) WDM OPTICAL COMMUNICATION SYSTEM

(75) Inventors: Dominique Hamoir, Nozay (FR); Dominique Bayart, Clamart (FR)

(73) Assignee: Alcatel, Paris (FR)

( * ) Notice: Subject to any disclaimer, the term of this patent is extended or adjusted under 35 U.S.C. 154(b) by 498 days.

(21) Appl. No.: 10/084,884

(22) Filed: Mar. 1, 2002

(65) Prior Publication Data

US 2002/0131119 A1  Sep. 19, 2002

(30) Foreign Application Priority Data

Mar. 16, 2001 (FR) ................ 01 440074

(51) Int. Cl.
*H04J 14/02* (2006.01)

(52) U.S. Cl. ........................ 398/92; 398/152

(58) Field of Classification Search .............. 398/82, 398/92, 37, 42, 65, 68, 91, 79, 152; 371/3, 371/55, 70; 359/327, 334
See application file for complete search history.

(56) References Cited

U.S. PATENT DOCUMENTS 4,570,081 A * 2/1986 Baldwin ............... 359/327
4,881,790 A * 11/1989 Mollenauer ............ 398/180
5,959,750 A 9/1999 Eskildsen et al.

FOREIGN PATENT DOCUMENTS

EP 1022870 A2 7/2000
WO WO 00/49721 A2 8/2000

OTHER PUBLICATIONS

WO 00 49721 A (CORVIS CORP) Aug. 24, 2000.*
Sugizaki R et al.: "Polarization insensitive broadband transparent DCF module with faraday rotator mirror, Raman-amplified by single polarization diode-laser" OFC/IOOC '99 . Optical Fiber Communication Conference, vol. 1, Feb. 21-26, 1999, pp. 279-281, XP002175123, San Diego, CA, USA.
Peter Riedel "Untersuchungen zum kunftigen Einsatz solitonengestutzter faseroptischer Nachrichtenubertragung bei 1,3, μm Wellenlange" Hamburg 1998, pp. 5-117.
Y. Emori, et al. "100nm bandwidth flat gain Raman amplifiers pumped and gain-equalized by 12-wavelength-channel WDM high power laser diodes" Opto-Technology Laboratory, Furukawa Electic Co., Ltd, Optical Fibre Communications Conference 1999, pp. PD19-1 to PD19-3.
Bigo, et al.: "Tbit/s (128×40 Gbits/s WDM) Transmission Over 3×100 km of TeraLight Fibre" ECOC 2000, 26th European Conference on Optical Communication, Sep. 3-7, 2000 Munich, Germany, vol. 5 Plenary Papers and Tutorials Post-Deadline papers.

* cited by examiner

*Primary Examiner*—Christine Leung
(74) *Attorney, Agent, or Firm*—Sughrue Mion, PLLC

(57) ABSTRACT

The present invention provides a WDM optical communication system, comprising input means and output means for an optical signal, an optical fibre path connecting signal-transmissively said input and output means, wherein the optical signal is amplified by means of Raman amplification and said optical fibre path comprises at least one Raman amplifier, further comprising WDM means for coupling at least two polarized pump radiation wavelengths with wavelengths less than the signal radiation wavelength into said Raman amplifier, wherein one pump radiation wavelength has a selected different polarization with respect to the polarization of the other pump radiation wavelengths.

7 Claims, 2 Drawing Sheets

WDM OPTICAL COMMUNICATION SYSTEM

The present invention relates to a WDM optical communication system with Raman amplification.

BACKGROUND OF THE INVENTION

Optical communication systems are a fast-growing constituent of communication networks. The term "optical communication system" as used in the following relates to any system or device which makes use of optical signals to transport information across an optical waveguiding medium. Optical communication systems comprise inter alia telecommunication systems, local area networks (LAN), cable television systems etc.

Wavelength division multiplexing (WDM) is a technique which allows to increase the capacity of fibre optic networks. In a WDM system, a plurality of optical channels are carried over a single waveguide, each channel being assigned a particular wavelength. The use of WDM systems for signal transmission is described in U.S. Pat. No. 5,959,750, the disclosure of which is incorporated herein by reference.

For the transmission capacity of optical fibres in optical communication systems is expected to advance in the future, the evolution of optical amplification is one of the core technologies involved in this process. A key to this evolution is the availability of extremely-broad-band optical amplifiers, offering amplification over nearly all the transmission window allowed by silica. These requirements can be met inter alia by Raman amplification.

Optical fibre Raman amplifiers (FRA) are well known and are known to be designed to operate at a desired wavelength between 1.25 µm and 1.7 µm. FRA utilize silica-based fibres and display a high transparency when unpumped. The working principle of FRA is based on stimulated Raman scattering as for example explained in the Ph.D. thesis of P. Riedel with the title "Untersuchungen zum künftigen Einsatz solitonengestützter faseroptischer Nachrichtenübertragung bei 1.3 µm Wellenlänge", Hamburg 1998, the disclosure of which is incorporated herein by reference. FRA can serve for example as a replacement for conventional repeaters or semiconductor-amplifiers, or for rare-earth-doped fibre amplifiers or in combination with them.

Y. Emori and S. Namiki disclose in OFC (Optical Fibre Communications Conference) 99, PD19-1 to PD19-3 Raman amplifiers which are pumped and gain equalized by 12-wavelength-channel WDM high power laser diodes. Every laser has to be multiplexed by a 11-MZI-planar lightwave circuit (PLC) and individually power-supplied by means of a controlling unit.

When Raman amplification in optical communication systems is used as mentioned above, i.e. in combination with several WDM wavelength pump channels, interference between adjacent pump channels will occur, i.e. they "crosstalk". This is due to stimulated Raman scattering and four-wave-mixing. Therefore, significant pumping efficiency will be lost in addition to pump instabilities caused by polarisation of the interfering channels.

Several solutions for these problems have been proposed:

The use of a Raman fibre laser as pumping means provides a high pump efficiency output which is located in only one channel. The use of two or more Raman fibre lasers is possible but is more costly and power-consuming. Raman lasers are not polarized.

Alternatively, the use of two semiconductor pump lasers for each required pump wavelength combined with a PBC (polarisation beam combiner) has been proposed, which allows to obtain an unpolarized output. However, this leads to a loss of power at the pump output in the range of 0.5 dB to 1 dB and requires an additional step in the fabrication of the Raman pumps. Moreover, this solution affords twice the number of pump units for a given number of pump channels. This doubles the overall cost and the costs of the PBC are high.

Another alternative is to use a single semiconductor pump laser for each required pump wavelength and to depolarize it by use of a polarisation maintaining fibre of a length L from about 10 to 100 m where its principal axis is rotated by 45° with respect to the principal axis of the polarisation maintaining fibre pigtail of the laser. This principle was used in Bigo et al. ECOC'00 (postdeadline paper no. 2), Munich 2000. In the experiment described in this paper each of the four pump lasers used for distributed Raman amplification was depolarized by this technique. However, the solution is not fully satisfactory, as firstly, a perfect depolarisation could not be obtained and secondly, the introduction of the polarisation maintaining fibre induced losses in the pump path of about 0.5 dB.

In addition all prior art systems described in the foregoing do not reduce the pump cross-talk.

The underlying problem of the present invention is therefore to avoid polarization effects in multichannel WDM pumps used in Fibre Raman Amplifiers (FRA) for localized as well as distributed Raman amplification while maintaining a high pumping efficiency and to reduce cross-talk between pump wavelengths.

SUMMARY OF THE INVENTION

This problem is solved by a WDM optical communication system with Raman amplification with the features of claim 1.

Accordingly, a WDM optical communication system, comprises input means and output means for an optical signal, an optical fibre path connecting signal-transmissively said input and output means, wherein the optic signal is amplified by means of Raman amplification and said optical fibre path comprises at least one Raman amplifier, further comprises WDM means for coupling at least two polarized pump radiation wavelengths with wavelengths less than the signal radiation wavelength into said Raman amplifier, whereby one pump radiation wavelength has a selected different polarization with respect to the polarization of the other pump radiation wavelengths.

This pump arrangement according to the invention with a suitable selection of the polarization provides a larger Raman gain with up to several dB more in signal-to-noise ratio (SNR) by reducing considerably the cross-talk between the pumps. It does also reduce the instabilities in the gain.

Preferably, the Raman amplification is a distributed Raman amplification with less noise compared to lumped Raman amplification. In another embodiment, the Raman amplification is localized Raman amplification.

In an advantageous embodiment, at least one pump radiation wavelength has a polarization which is orthogonal with respect to the polarization of at least one other pump radiation wavelength.

It is particularly preferred that only the polarization of the lower part of the pump wavelengths multiplex is orthogonal with respect to the upper part. For example, the pump wavelengths are between 1420 and 1500 nm and the signal in the C and L band is between 1525 and 1610 nm. Particularly, using three pumps (the first three: lower part) out of exemplary four pumps and using an orthogonal polarization for the fourth spaced apart one (upper part), is highly efficient, because most pump cross-talk through Raman scattering takes place between the extreme pump channels.

It is understood that the aforementioned advantages and the features of the invention explained in the following, are not only used in the specifically described combination, but can also be used by a person skilled in the art in other combinations or alone, without exceeding the scope of the invention.

BRIEF DESCRIPTION OF THE DRAWINGS

The invention is schematically explained in FIGS. 1 through 3 and is described in detail, where reference is made to the drawings.

DETAILED DESCRIPTION OF THE INVENTION

Figure 1:
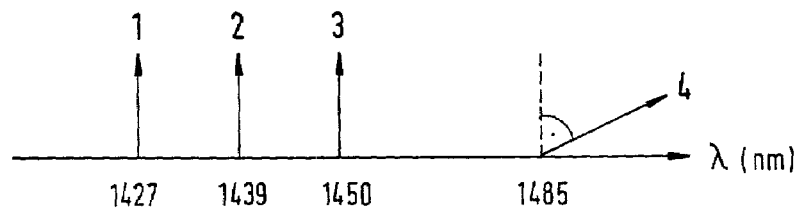
FIG. 1 schematically shows an embodiment of the invention when using 4 pumps.

FIG. 1 shows the working principle of the invention. In this specific embodiment, 4 different pump wavelengths are used. The three pump wavelengths at 1427, 1439 and 1450 nm are strongly interacting with the fourth pump wavelength when they are depolarized but are not interacting when they are polarized and the pump wavelength 4 is orthogonal with respect to the other three pump wavelengths.

Figure 2:
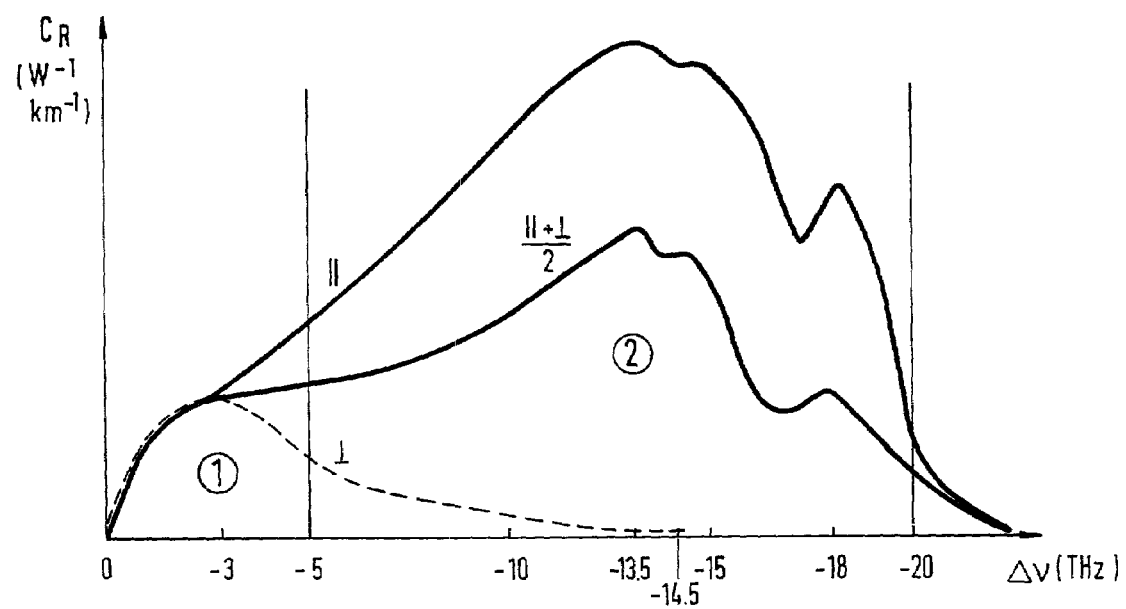
FIG. 2 schematically shows a diagram which indicates the Raman interactions between two orthogonal polarized and between two copolarized wavelength.

FIG. 2 shows a diagram which indicates the Raman interactions between two orthogonal polarized and between two copolarized wavelengths. The diagram shows the Raman efficiency $C_R$ (W$^{-1}$km$^{-1}$) related to the difference $\Delta v$ of the frequency of the pump and of the respective channel. The first curve denoted with the sign $\perp$ shows the behaviour for two orthogonally polarized wavelengths. Curve 2 is denoted with the sign $\parallel$ showing the behaviour for two copolarized wavelengths. Curve 3 referenced to as $(\parallel+\perp)/2$ shows the behaviour for two unpolarized wavelengths.

FIG. 2 further shows two different areas, denoted with the numbers 1 and 2. Area 1 shows the Raman interaction behaviour of curves 1 to 3 in the case that the wavelengths of the pump (for example at 1427 nm) and of the signal, for example at 1439 nm, are spaced apart with less than 5 THz. As can be seen from area 1, the behaviour in all three cases shows about the same effect.

As can be seen in area 2 for differences in wavelength spacing with more than 5 THz, the energy transfer between the two wavelengths is at a maximum when they are copolarized and is halved when they are depolarized. The effect of the present invention can be seen in curve 1 in area 2, where this energy transfer is minimal for orthogonally-polarized wavelengths. Examples of wavelengths corresponding to this case are 1427 and 1485 nm.

Figure 3:
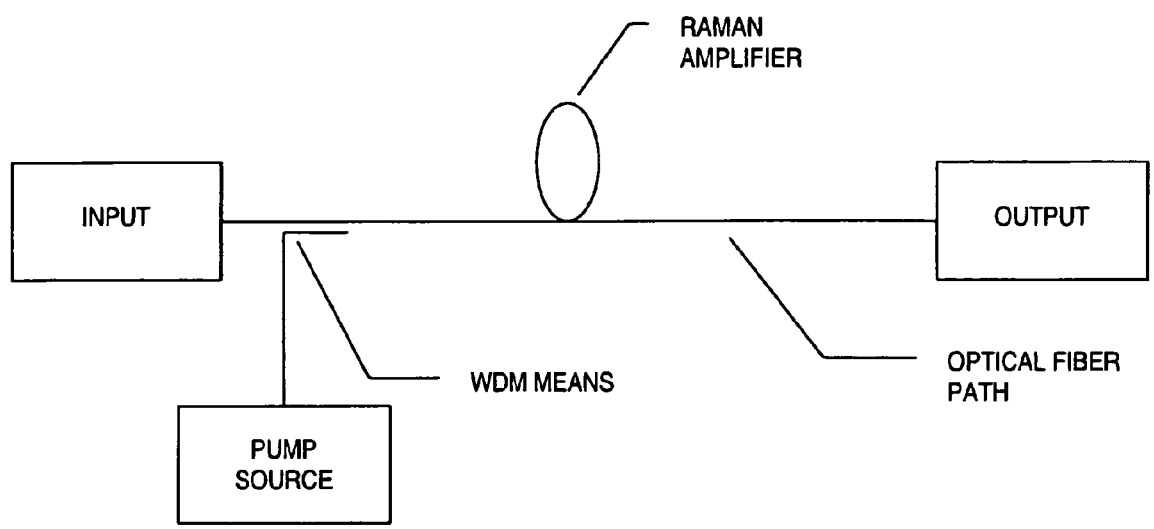
FIG. 3 schematically shows a WDM optical communication system of the present invention.

Finally, as shown in FIG. 3, a WDM optical communication system of the present invention, contains input and output means for an optical signal. There is an optical fibre path connecting signal-transmissively the input and output means, where the optic signal is amplified by means of Raman amplification via at least one Raman amplifier. Further, the system contains comprises WDM means for coupling at least two polarized pump radiation wavelengths with wavelengths less than the signal radiation wavelength into said Raman amplifier, whereby one pump radiation wavelength has a selected different polarization with respect to the polarization of the other pump radiation wavelengths.

What is claimed is:

1. A WDM optical communication system, said system comprising an optical signal input, an optical signal output, an optical fiber path having at least one Raman amplifier and connecting said input and output, said Raman amplifier receiving a plurality of pump signals whereby an optical signal at said input is amplified by means of Raman amplification during passage through said optical fiber path, wherein said pump signals include a first pump signal having a first pump wavelength in a first part of a pump wavelength band, a second pump signal having a pump wavelength in a continuous second part of said pump wavelength band, and a third pump signal having a third pump wavelength in said second part of said pump wavelength band, wherein the polarization of said first pump signal is different from the polarizations of said second and third pump signals and bears the same predetermined relationship to the polarizations of each of said second and third pump signals.

2. An amplifier according to claim 1, wherein said first pump signal is orthogonally polarized with respect to said second and third pump signals.

3. An amplifier according to claim 2, wherein said first part is an upper part of said pump wavelength band and said second part is a lower part of said pump wavelength band.

4. An amplifier according to claim 1, wherein said first part is an upper part of said pump wavelength band and said second part is a lower part of said pump wavelength band.

5. An amplifier according to claim 4, characterized in that the amplification is in the C- or L-Band and the lower part of the wavelength band comprises wavelengths 1427, 1439, and 1450 nm and the upper part comprises a wavelength of 1485 nm.

6. An amplifier according to claim 1, wherein the Raman amplification is a distributed Raman amplification.

7. An amplifier according to claim 1, wherein the Raman amplification is a localised Raman amplification.

* * * * *